J. W. PENNEWILL.
ACCOUNTING SHEET.
APPLICATION FILED OCT. 5, 1915.

1,226,111.

Patented May 15, 1917.
2 SHEETS—SHEET 1.

WITNESSES
Frank C. Palmer
A. L. Kitchin

Fig. 1

INVENTOR
J. W. Pennewill
BY Munn & Co.
ATTORNEYS

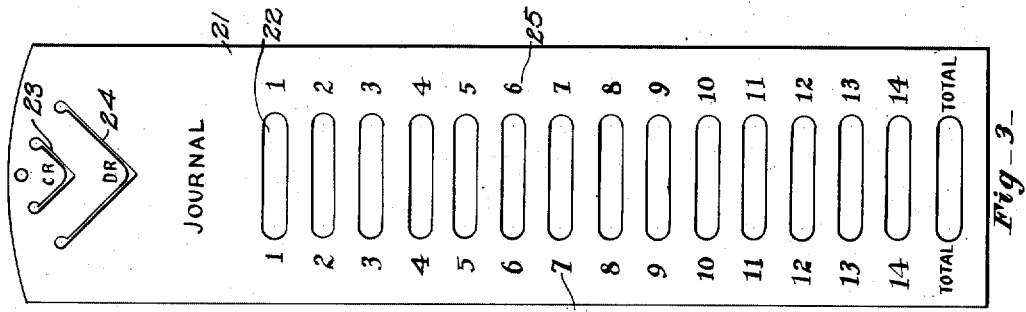

UNITED STATES PATENT OFFICE.

JAMES WILLIAM PENNEWILL, OF SILVER CITY, NEW MEXICO.

ACCOUNTING-SHEET.

1,226,111. Specification of Letters Patent. Patented May 15, 1917.

Application filed October 5, 1915. Serial No. 54,156.

*To all whom it may concern:*

Be it known that I, JAMES W. PENNEWILL, a citizen of the United States, and a resident of Silver City, in the county of Grant and State of New Mexico, have invented a new and Improved Accounting-Sheet, of which the following is a full, clear, and exact description.

This invention relates to sheets for carrying accounts and particularly to a journal sheet and has for an object the provision of an improved arrangement of ruling whereby it is possible to carry an entire monthly record on one page for a large number of distinct items.

Another object in view is to provide horizontal rulings arranged in such manner as to produce horizontal shaded spaces and horizontal clear spaces.

A still further object of the invention is to provide horizontal spaces of different appearance together with vertical rulings intersecting these spaces for dividing the spaces into blocks.

In the accompanying drawings:—

Figure 1 is a plan view of one end of a sheet embodying the invention;

Fig. 2 is a plan view of the opposite end of the sheet to that shown in Fig. 1;

Fig. 3 is a plan view of a guide used in locating the various blocks and spaces on the sheet shown in Figs. 1 and 2.

In constructing a sheet embodying the invention it is aimed to arrange the rulings so that the items entered on the sheet may be positioned in certain sequence and also arranged so that space is economized by the concentration of the debits and credits of a large number of accounts in a minimum space without sacrificing any desired information. In the drawing twelve accounts or headings are shown and horizontal rulings are provided for an entry in each account for an entire month. The entries are taken from a daily blotter at the end of each day in totals and posted to the proper position under the various headings. The drawings also show a construction whereby the shaded or colored spaces are of substantially equal width to the open or unshaded spaces, but it is evident that either of these spaces could be varied in width without departing from the spirit of the invention and that instead of rulings coloring matter could be used either on one or both sides, whereby distinguishing horizontal spaces will be produced.

Referring to the accompanying drawings by numerals, 1 indicates a set of rulings which divide the sheet so as to produce a space 2 at the upper edge for receiving various information, as for instance, the title 3 and printed directions 4 as well as lines 5, 6 and 7 which present means for receiving the name of the person using the sheet and the date of the various entries. Immediately below the rulings 1 is a horizontal ruling 8 and below this ruling is another horizontal ruling 9 which provide spaces 10 and 11, respectively, when the vertical rulings 12 are placed in position. The spaces or blocks 10 are designed to receive numbers for indicating the different accounts or headings, while the spaces 11 receive the name of the particular heading, as for instance, the word "Cash" shown under the numeral 5.

Arranged at the left of the space marked 1 is a vertical ruling 13 which provides a date space 14 for indicating the particular day on which any entry is made, there being thirty one pairs of horizontal spaces required for a month's record hereinafter described indicated by the numbers in this column. Another column 15 is also provided near the center of the sheet and is spaced from column 16 by a space 17 which is adapted to receive explanatory matter of any desired kind. Arranged at the right or outer end of the sheet is a column 18 similar to column 15. The columns 14, 15, 16 and 18 all receive the same numbers in the same horizontal plane whereby it will be easy to locate a particular entry on any particular day without being compelled to place a ruler on the sheet and find a particular block in order to make the entry correctly.

In order that the spaces between the vertical rulings 12 may be properly blocked off and given distinctive characteristics, shaded spaces 19 are provided adjacent which is arranged an unshaded space 20. From the top of the sheet downwardly in spaces 19—20 are arranged in the order of an open space, a shaded space and then an open space followed by a shaded space and so on for the full width of the sheet. The shaded space may be made in any suitable manner, for instance, by printing, lithographing, ruling or otherwise as preferred. It will also be evident that both spaces could be shaded by coloring matter if desired, but if that were done they must be distinct so as to produce two distinct horizontal spaces extending across the sheet, which spaces are divided into blocks by the vertical rulings 12.

In entering the items on the sheet, as for instance, a cash item, the same is placed under column 5, and if the entry is to be made on the first day of the month it is made on one of the spaces 19—20. For the purpose of identification the open spaces receive the debit items while the shaded spaces receive the credit items. It is evident that this could be reversed without departing from the spirit of the invention, the idea being to present means which will distinguish the spaces in which the different items are entered.

At the end of the month, after all the entries have been made, it is found desirable to add the various debit items and also the various credit items and place the summary on the bottom open space 20' and the bottom shaded space 19'. In order to do this quickly and correctly a guide 21 is provided, as shown in Fig. 3, which guide is formed with elongated apertures 22, said apertures being all approximately of a length equaling the width of the space between any of the vertical rulings 12 and of a height equal to the width of either of the spaces 19 or 20. The apertures 22 are spaced apart for a distance equal the width of either of the spaces 19 or 20 so that when the guide is fitted on the sheet with the edge of the sheet in the upper part of slot 23, the apertures 22 will expose to view the credit items on the shaded space whereby the credit items may be easily added and entered on the shaded space 19' through the aperture marked total on the guide. The guide may then be changed so that the edge of the sheet may be arranged at the upper part of slot 24, whereupon the credit items will be concealed and the debit items will be exposed through apertures 22, thus providing an easy addition of the debit items. In order to insure the proper alining of the apertures with the spaces 19 and 20 the various apertures are provided with rows of numbers 25 and 26.

By indexing the entries as described and using both sides of the sheet, six sheets will be sufficient to carry the journal record for one year without sacrificing any necessary information in keeping a set of books properly. If a combination ledger and balance sheet is used the footings provided in spaces 19' and 20' may be posted to such a sheet, otherwise the same may be posted to a regular balance sheet or a ledger of any desired kind, the same not forming any part of the present invention.

What I claim is:—

1. In a sheet of the character described, a plurality of horizontal rulings arranged so as to produce independent horizontal spaces, a guide formed with notches adjacent the upper end corresponding to said spaces, and a plurality of apertures in the body of the guide corresponding to said notches, whereby one of the horizontal rulings will be disclosed through said aperture when one of the notches engages the upper edge of said sheet, and when the other notch engages the upper edge of said sheet another horizontal ruling will be disclosed to view, thus allowing a vertical addition of numbers on the different horizontal rulings.

2. In a sheet of the character described, a plurality of horizontal rulings for producing horizontal spaces, said spaces being of the same width, each alternate space being filled with shading for causing the alternate spaces to be distinct, a guide formed with spaced openings, said openings being spaced apart equal to the width of said spaces, and means on the guide for causing said openings to appear opposite either of said spaces.

In testimony whereof I have signed my name to this specification in the presence of two subscribing witnesses.

JAMES WILLIAM PENNEWILL.

Witnesses:
M. B. BUCHANAN,
E. M. BRUMBACK